United States Patent
Kato et al.

(10) Patent No.: US 9,357,711 B2
(45) Date of Patent: Jun. 7, 2016

(54) ELECTRICALLY POWERED GARDENING TOOL

(71) Applicant: MAKITA CORPORATION, Aichi (JP)

(72) Inventors: Kazuya Kato, Aichi (JP); Yuki Koide, Aichi (JP)

(73) Assignee: MAKITA CORPORATION, Aichi (JP)

( * ) Notice: Subject to any disclaimer, the term of this patent is extended or adjusted under 35 U.S.C. 154(b) by 244 days.

(21) Appl. No.: 13/933,370

(22) Filed: Jul. 2, 2013

(65) Prior Publication Data

US 2014/0007717 A1 Jan. 9, 2014

(30) Foreign Application Priority Data

Jul. 4, 2012 (JP) .................................. 2012-150816

(51) Int. Cl.
*A01G 3/053* (2006.01)
*F16H 21/18* (2006.01)
*A01G 3/04* (2006.01)
*A01G 3/06* (2006.01)

(52) U.S. Cl.
CPC ................ *A01G 3/053* (2013.01); *F16H 21/18* (2013.01); *A01G 3/067* (2013.01); *A01G 2003/0461* (2013.01); *Y10T 74/18248* (2015.01)

(58) Field of Classification Search
CPC ........................................ A01G 3/047–3/0535
USPC .................................... 30/208–210, 215–220
See application file for complete search history.

(56) References Cited

U.S. PATENT DOCUMENTS 3,193,925 A * 7/1965 Hawley ............................ 30/210
3,623,223 A * 11/1971 Edgell et al. .................... 30/220
3,699,655 A * 10/1972 Taylor et al. ..................... 30/216
3,774,302 A * 11/1973 Ketchpel et al. ................ 30/210
3,897,630 A * 8/1975 Glover et al. .................... 30/220
3,909,943 A * 10/1975 Buschman ....................... 30/216
3,958,331 A * 5/1976 Klebe, Jr. ......................... 30/216
3,959,878 A * 6/1976 Irelan et al. ..................... 30/220
3,962,924 A * 6/1976 Glover et al. ..................... 74/50
3,971,130 A * 7/1976 Querfurth et al. .............. 30/220

(Continued)

FOREIGN PATENT DOCUMENTS

DE 102007005182 7/2008
DE 102009040589 3/2011

(Continued)

OTHER PUBLICATIONS

Extended European Search Report for EP 13003388.9 having a mailing date of Oct. 16, 2013.

*Primary Examiner* — Jason Daniel Prone
(74) *Attorney, Agent, or Firm* — Greenblum & Bernstein P.L.C.

(57) ABSTRACT

An electrically powered gardening tool of the type which includes a speed-reduction gear mounted in place to be driven by operation of an electric motor, a crank-cam in the form of overlapped eccentric disk plates fixed to a bottom surface of the speed-reduction gear by means of connecting pins for rotation therewith, and a pair of relatively reciprocating shear blades assembled with the eccentric disk plates. In the gardening tool, an elastic bushing is disposed in a mounting hole formed in the speed-reduction gear or each eccentric disk plate of the crank-cam for engagement with the connecting pins fixed to the eccentric disk plate or the speed-reduction gear, and a stopper is provided to restrict deformation of the elastic bushing caused by load applied to the crank-cam.

6 Claims, 6 Drawing Sheets

(56) References Cited

U.S. PATENT DOCUMENTS

| | | | | |
|---|---|---|---|---|
| 3,973,378 | A * | 8/1976 | Bartasevich et al. | 30/218 |
| 4,619,045 | A * | 10/1986 | Mayer | 30/216 |
| 4,979,303 | A * | 12/1990 | Han | 30/210 |
| 5,155,914 | A * | 10/1992 | Ohkanda | 30/208 |
| 5,271,154 | A * | 12/1993 | Ohkanda | 30/216 |
| H1428 | H * | 4/1995 | Ohkanda | 30/210 |
| 5,653,030 | A * | 8/1997 | Yokoyama et al. | 30/216 |
| 5,689,887 | A * | 11/1997 | Heywood et al. | 30/220 |
| 5,771,583 | A * | 6/1998 | Kremsler et al. | 30/216 |
| 6,170,159 | B1 * | 1/2001 | Kramer et al. | 30/216 |
| 6,263,579 | B1 * | 7/2001 | Nagashima | 30/220 |
| 6,874,303 | B1 * | 4/2005 | Yang | 30/216 |
| 7,155,830 | B2 * | 1/2007 | Sasaki et al. | 30/210 |
| 7,290,641 | B2 * | 11/2007 | Lee | 30/216 |
| 7,634,926 | B2 * | 12/2009 | Park et al. | D06F 37/304 68/23.1 |
| 7,757,405 | B2 * | 7/2010 | Peterson et al. | 30/220 |
| 7,788,811 | B2 * | 9/2010 | Hanada et al. | 30/216 |
| 8,397,389 | B2 * | 3/2013 | Geromiller | 30/208 |
| 8,732,959 | B2 * | 5/2014 | Lugert et al. | 30/216 |
| 8,826,546 | B2 * | 9/2014 | Svennung | 30/216 |
| 8,918,998 | B2 * | 12/2014 | Heinzelmann et al. | 30/208 |
| 8,931,574 | B2 * | 1/2015 | Watanabe | 30/369 |
| 8,959,780 | B2 * | 2/2015 | Masalin et al. | 30/208 |
| 2007/0169599 | A1 * | 7/2007 | Mace et al. | 30/210 |
| 2008/0196376 | A1 * | 8/2008 | Berti et al. | 30/393 |
| 2010/0095533 | A1 * | 4/2010 | Takahashi et al. | 30/228 |
| 2011/0179651 | A1 * | 7/2011 | Hittmann et al. | 30/216 |
| 2012/0036722 | A1 * | 2/2012 | Hittmann et al. | 30/216 |
| 2012/0167394 | A1 | 7/2012 | Lugert et al. | |
| 2013/0025135 | A1 * | 1/2013 | Gejervall et al. | 30/216 |
| 2013/0031785 | A1 * | 2/2013 | Kaupp | 30/208 |
| 2013/0160304 | A1 * | 6/2013 | Tate | 30/216 |
| 2013/0192432 | A1 * | 8/2013 | Barker | 30/216 |
| 2013/0318799 | A1 * | 12/2013 | Kato et al. | 30/216 |
| 2013/0326885 | A1 * | 12/2013 | Kaupp | 30/208 |
| 2015/0150194 | A1 * | 6/2015 | Wang et al. | A01G 3/053 |

FOREIGN PATENT DOCUMENTS

| | | | |
|---|---|---|---|
| EP | 0505789 A2 * | 9/1992 | |
| EP | 2281440 A1 * | 2/2011 | |
| EP | 2681987 B1 * | 9/2014 | |
| GB | 2352609 A * | 2/2001 | |
| JP | 2005-295922 | 10/2005 | |
| WO | 93/16585 | 9/1993 | |
| WO | WO 2010113541 A1 * | 10/2010 | |

* cited by examiner

ELECTRICALLY POWERED GARDENING TOOL

BACKGROUND OF THE INVENTION

1. Field of the Invention

The present invention relates to an electrically powered gardening tool such as a power-operated hedge trimmer, an electrically powered grass shear and the like.

2. Description of the Prior Art

Disclosed in Japanese Patent Laid-open Publication No. 2005-295922 is a hedge trimmer of the type which includes a speed-reduction gear arranged to be rotated by operation of an electric motor, a crank-cam in the form of overlapped eccentric disk plates connected to a bottom surface of the speed-reduction gear by means of connecting pins for rotation therewith, and a pair of relatively reciprocating shear blades assembled with the eccentric disk plates. In operation of the hedge trimmer, the speed-reduction gear is driven by operation of the electric motor to rotate the eccentric disk plates of the crank-cam thereby to cause relatively reciprocating movement of the shear blades in engagement with the eccentric disk plates.

In the hedge trimmer, the connecting pins fixed to the crank-cam are detachably engaged within mounting holes formed in the speed-reduction gear to facilitate replacement of the shear blades. In such connecting structure of the crank-cam, clearance in the mounting holes causes slight movement of the connecting pins when the crank-cam is driven by rotation of the speed-reduction gear, resulting in the occurrence of contact noise of the connecting pins against the mounting holes.

To restrain the occurrence of contact noise, an elastic bushing may be interposed between the connecting pins and the mounting holes respectively. The busing is, however, damaged if the connecting pins of the crank-cam are applied with heavy load in a radial direction when hard tree branches or fine stones are caught in the shear blades during trimming operation.

SUMMARY OF THE INVENTION

It is, therefore, an object of the present invention to provide an electrically powered gardening tool wherein an elastic bushing disposed in the connecting portion of the crank-cam with the speed-reduction gear is protected without causing any damage even if the crank-cam is applied with heavy load during trimming operation.

According to the present invention, the object is accomplished by providing an electrically powered gardening tool which comprises a speed-reduction gear mounted in place to be driven by operation of an electric motor, a crank-cam in the form of overlapped eccentric disk plates fixed to a bottom surface of the speed-reduction gear by means of connecting pins for rotation therewith, and a pair of relatively reciprocating shear blades assembled with the eccentric disk plates, wherein an elastic bushing is disposed in a mounting hole formed in the speed-reduction gear or each eccentric disk plate of the crank-cam for engagement with the connecting pins fixed to the eccentric disk plate or the speed-reduction gear, and wherein a stopper is provided to restrict deformation of the elastic bushing caused by load applied to the crank-cam.

In an aspect of the present invention, the stopper for restricting deformation of the elastic bushing is in the form of a cylindrical stopper made of hard material such as hard synthetic resin, steel metal, ceramics and the like and being formed smaller in diameter than the elastic bushing and coupled with the connecting pins in the mounting holes respectively.

In another aspect of the present invention, the stopper is in the form of a cylindrical stopper made of stainless steel and being formed larger in inner diameter than the outer diameter of each of the connecting pins and engaged with the inner surface of each of the mounting holes.

In a further aspect of the present invention, the connecting pins each are a stepped pin formed with a large diameter portion smaller in diameter than the elastic bushing, wherein the stopper is in the form of the large diameter portion of the stepped pin.

In a still another aspect of the present invention, the stopper is in the form of a stopper pin fixed to the bottom of the speed-reduction gear to be concentrically inserted into an engagement hole formed in the crank-cam, wherein the engagement hole is formed larger in diameter than the stopper pin to be spaced from the stopper pin in a clearance smaller than thickness of the elastic bushing.

BRIEF DESCRIPTION OF THE DRAWINGS

In the drawings:

FIG. 5 (*a*)~5(*c*) each are a sectional view of a connecting portion of a speed-reduction gear and a crank-cam;

FIG. 7 (*a*)~7 (*e*) each are a sectional view of modifications of a connecting portion of the speed-reduction gear and the crank-cam.

DESCRIPTION OF THE PREFERRED EMBODIMENTS

Hereinafter, a preferred embodiment of an electrically powered hedge trimmer according to the present invention will be described with reference to the accompanying drawings. As shown in FIGS. 1~5, the hedge trimmer 10 comprises a speed-reduction gear 31 mounted in place to be driven by operation of an electric motor 21, a crank-cam 34 in the form of overlapped eccentric disk plates fixed to a bottom surface of the speed-reduction gear 31 by means of connecting pins 35, 35 for rotation therewith, and a pair of relatively reciprocating shear blades 41, 42 assembled with the crank-cam 34. In the hedge trimmer 10, the connecting pins 35, 35 each are fixed at their one ends to the crank-cam 34 and engaged at their other ends with mounting holes 32, 32 formed in the speed-reduction gear 31 through elastic resilient bushings 36, 36, and stoppers 37, 37 are provided to restrict deformation of the elastic bushings 36, 36 caused by load applied to the crank-cam 34.

Figure 1:
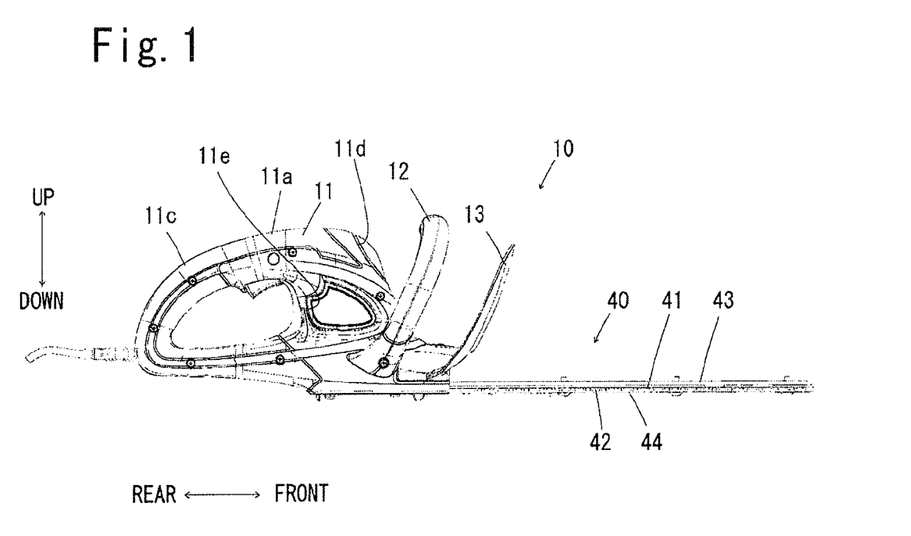
FIG. 1 is a side view of a hedge trimmer in accordance with the present invention.
Figure 2:
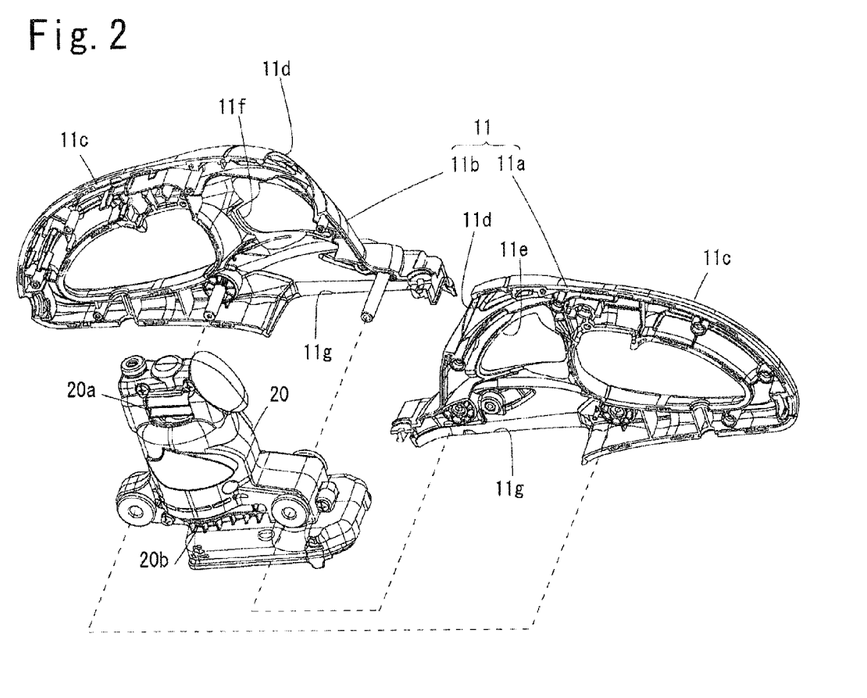
FIG. 2 is a disassembled view of the hedge trimmer shown in FIG. 1.
Figure 3:
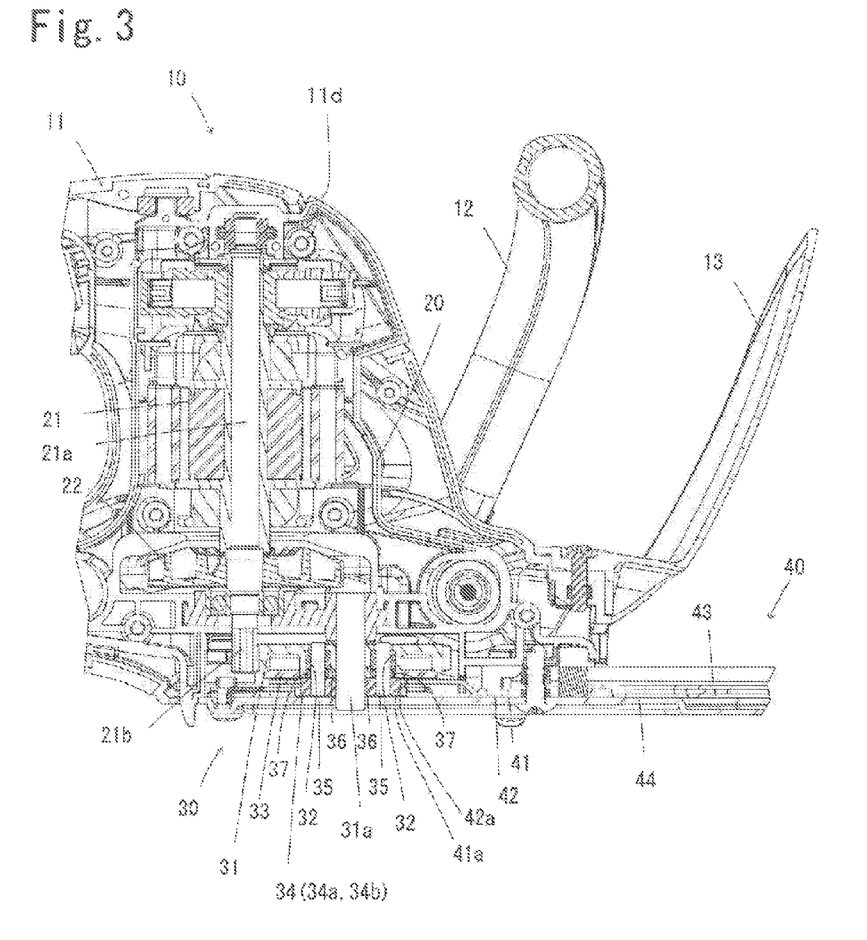
FIG. 3 is a partly enlarged sectional view taken along a fore-and-aft direction in FIG. 1.

As shown in FIGS. 1~3, the outer shell housing 11 of hedge trimmer 10 is composed of two parts 11*a* and 11*b*. A motor housing 20 is assembled within the outer shell housing 11 for containing the electric motor 21 together with a cooling fan 22 and a crank mechanism 30. The outer shell housing 11 has a rear portion integrally provided with a handle 11*c* to be held with one hand of an operator. A chip guard 13 is fixed to the front portion of shell housing 11 at the front side of a front grip handle 12 to protect the operator from shrubs, tree branches splashed by cutting. The outer shell housing 11 is formed at its upper and side walls with openings 11d~11f for introducing outside air into an air intake opening 20a of the motor housing 20. A downward opening 11g is formed at the front bottom of shell housing 11 for mounting a blade assembly 40 within the motor housing 20 and for causing the downward flow of air from an exhaust opening 20b of motor housing 20.

As shown in FIG. 3, the motor housing 20 is formed to contain therein the electric motor 21 together with the cooling fan 22 and crank mechanism 30 as described above. As shown in FIG. 2, the motor housing 20 is formed at its upper peripheral wall with the air intake opening 20a and at its lower peripheral wall with the exhaust opening 20b. As shown in FIG. 3, the electric motor 21 is mounted upright within the motor housing 20. The cooling fan 22 is mounted on the output shaft 21a of motor 21 to be driven for introducing outside air into the air intake opening 20a of motor housing 20 and for passing the introduced air through the periphery of motor 21 and blowing out the air radially downward from the exhaust opening 20b.

Figure 4:
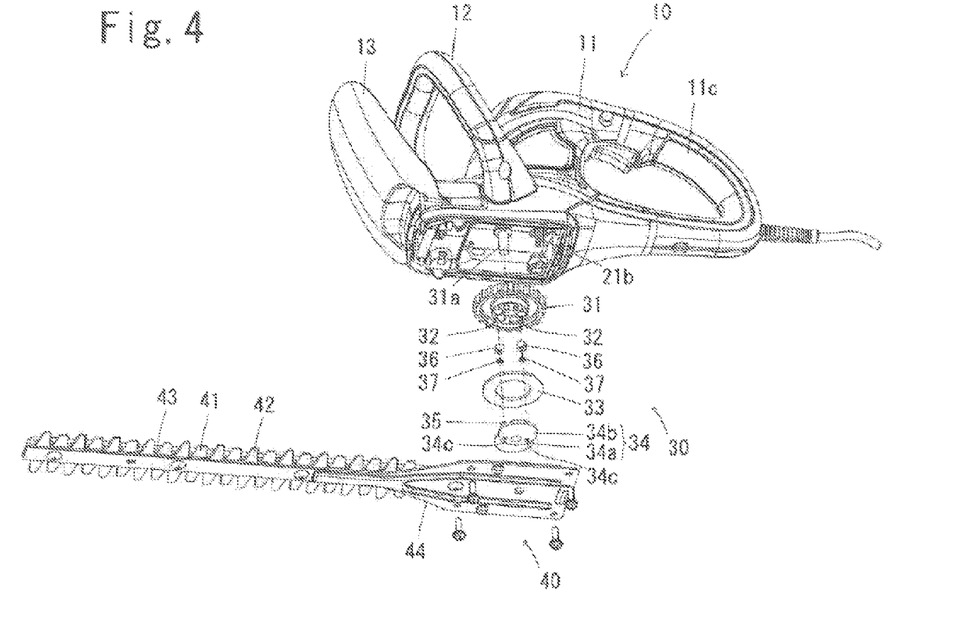
FIG. 4 is a disassembled perspective view of a crank mechanism shown in FIG. 1.
Figure 5A:
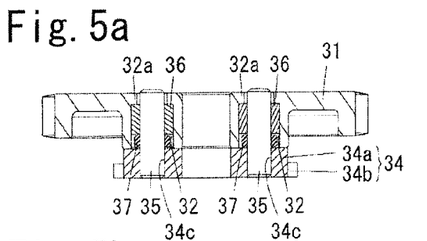

As shown in FIGS. 3 and 4, the crank mechanism 30 is assembled within the lower portion of motor housing 20 to convert rotation of the motor 21 to relatively reciprocating movement of the shear blades 41, 42. The crank mechanism 30 includes a speed-reduction gear 31 in mesh with a pinion gear 21b fixed to a distal end of drive shaft 21a of motor 21 and the crank-cam 34 fixedly mounted to a bottom surface of speed-reduction gear 31 by means of two connecting pins 35, 35 through a washer 33. The crank cam 34 is in the form of overlapped two disk plates 34a, 34b which are eccentrically mounted to the speed-reduction gear 31. As shown in FIG. 5 (a), an elastic bushing 36 is disposed within each space between the connecting pins 35, 35 and the mounting holes 32, 32 of speed-reduction gear 31, and a cylindrical stopper 37 is disposed within each space between the connecting pins 35, 35 and the mounting holes 32, 32 to restrict deformation of the elastic bushings 36 caused by heavy load applied thereto.

The speed-reduction gear 31 is detachably mounted on a support shaft 31a fixed to a bottom structure of motor housing 20 and is meshed with the pinion gear 21b for rotation therewith. As shown in FIGS. 3, 4 and 5 (a), the mounting holes 32, 32 are formed in the speed-reduction gear 31 to contain the elastic bushings 36, 36 through which the connecting pins 35, 35 are inserted for connection with the disk plates 34a, 34b of crank-cam 34. The mounting holes 32, 32 each are in the form of a stepped hole having a small diameter portion for insertion of the connecting pin 35 and a large diameter portion for containing the bushing 36 coupled with the connecting pin 35. When the crank-cam 34 is applied with radial load, the connecting pins 36 each are engaged at their distal ends with the small diameter portion of each mounting hole 32 to prevent the elastic bushing 36 from being collapsed by pushing pressure against the inner peripheral surface of the mounting hole.

As shown in FIG. 4, the crank-cam 34 is in the form of overlapped two disk plates 34a, 34b which are eccentrically mounted on the support shaft 31a and opposed across the support shaft 31a in a phase difference of 180°. Two through holes 34c, 34c are formed in the disk plates 34a, 34b of crank-cam 34 for engagement with the proximal ends of connecting pins 35, 35. As shown in FIGS. 3, 4 and 5 (a), the connecting pins 35, 35 fixed to the crank cam 34 are inserted within the mounting holes 32, 32 through the elastic bushings 36, 36. The bushings 36, 36 are made of synthetic rubber to prevent the occurrence of noise caused by abutment of connecting pins 35, 35 against the inner surface of mounting holes 32, 32. In a condition where the connecting pins 35, 35 have been inserted into the mounting holes 32, 32, each distal end of connecting pins 35 is slightly spaced from each small diameter portion 32a of mounting holes 32, 32.

The stoppers 37, 37 each are in the form of a cylindrical element of stainless steel which is positioned beneath the elastic bushing 36 in the lower portion of mounting hole 32. The stopper 37 is slightly smaller in diameter than the outer diameter of resilient bushing 36 to prevent the bushing 36 from being collapsed by radial heavy load applied thereto. When the crank-cam 34 is applied with heavy load in a radial direction, the stoppers 37, 37 are brought into engagement with the inner surface of mounting holes 32 before the bushings 36, 36 are collapsed by pressure between the connecting pins 35, 35 and mounting holes 32, 32.

Figure 6:
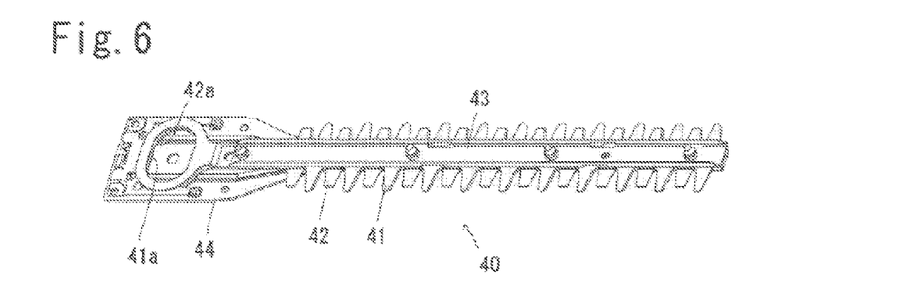
FIG. 6 is a perspective view of a shear blade assembly.
Figure 7A:
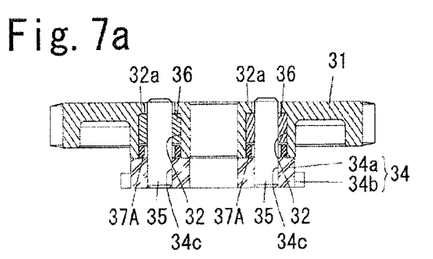
Figure 7B:
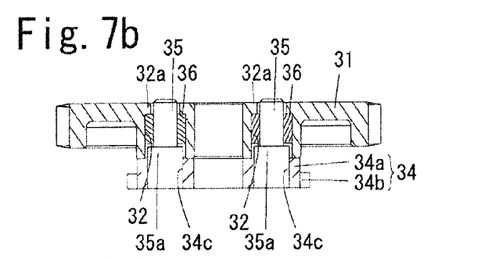
Figure 7C:
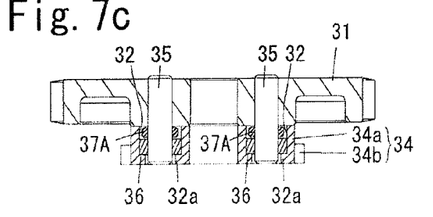
Figure 7D:
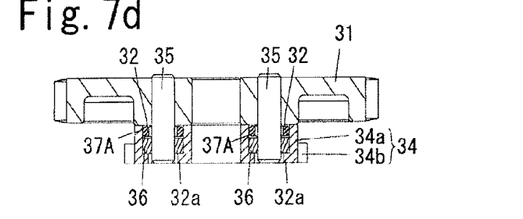
Figure 7E:
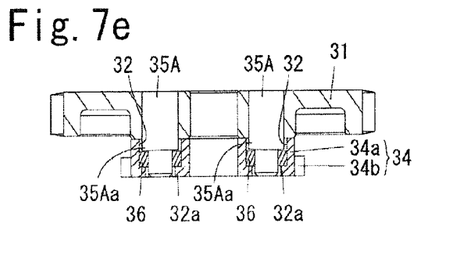

As shown in FIGS. 3, 4 and 6, the shear blade assembly 40 is detachably mounted to the bottom surface of motor housing 20. The blade assembly 40 is composed of a pair of shear blades 41, 42 supported in face-to-face contact by means of a pair of guide plates 43, 44 in such a manner to permit reciprocal rectilinear movement of them in a fore-and-aft direction. The shear blades 41, 42 each are formed with a series of cutter teeth along its edges. The disk plates 34a, 34b of crank-cam 34 are coupled with cam follower slots 41a, 42a formed in each proximal portion of shear blades 41, 42 to be movable in a lengthwise direction.

When the electric motor 24 is activated in operation of the hedge trimmer 10, the shear blades 41, 42 are reciprocally driven through the crank mechanism 30. Specifically, the speed reduction gear 31 in mesh with the pinion gear 21b is driven by rotation of the drive shaft 21a of electric motor 20 to eccentrically rotate the disk plates 34a, 34b of crank-cam 34. The eccentric rotation of the disk plates 34a, 34b in the cam follower slots 41a, 42a causes reciprocal rectilinear movement of the shear blades 41, 42. When the hedge trimmer is manipulated by an operator holding the handles with his both hands for trimming plant growth such as hedges, shrubs, tree branches and the like, the plant growth is trimmed by the shear blades 41, 42.

When the crank-cam 34 is detachably assembled with the speed-reduction gear 31, the connecting pins 35, 35 are fixedly connected at their one ends to the disk plates 34a, 34b and engaged at their other ends with the inner surface of mounting holes 32, 32 through the elastic bushings 36, 36. Thus, each elastic bushing 36 is interposed between the outer surface of connecting pin 35 and the inner surface of mounting hole 32 to restrain the occurrence of noise caused by direct contact of the connecting pin 35 with the speed-reduction gear 31 and to restrain vibration transmitted to the speed-reduction gear 31 from the shear blade assembly.

The cylindrical stoppers 37, 37 of stain-less steel smaller in diameter than the elastic resilient bushings 36 are coupled with the connecting pins 32 in the mounting holes 32, 32. If hard tree branches or fine stones are caught in the shear blades 41, 42 during trimming operation, the disk plates 34a, 34b of crank-cam 34 are applied with heavy load from the shear blades. In such an instance, the elastic bushings 36, 36 are pressed by radial movement of the connecting pins 35, 35 against the inner surface of mounting hole 32, while the cylindrical stoppers 37, 37 are brought into engagement with the inner surface of mounting hole 32 or the distal end of connecting pin 35 is brought into engagement with the inner surface of the small diameter portion 32a of mounting hole 32. This is effective to restrain deformation of the elastic bushing 36 and to prevent the elastic resilient bushing 36 from being collapsed by the heavy load.

Figure 5B:
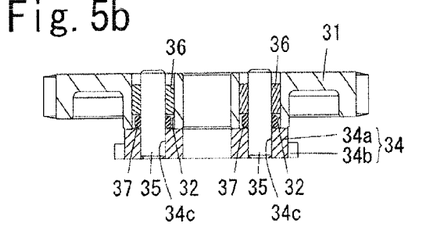
Figure 5C:
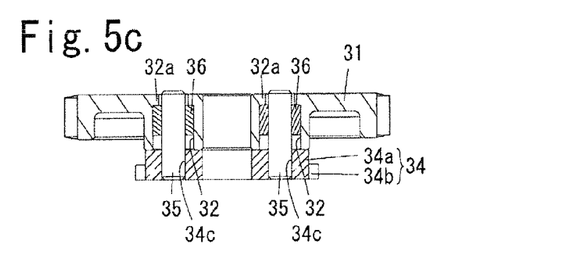
Figure 8:
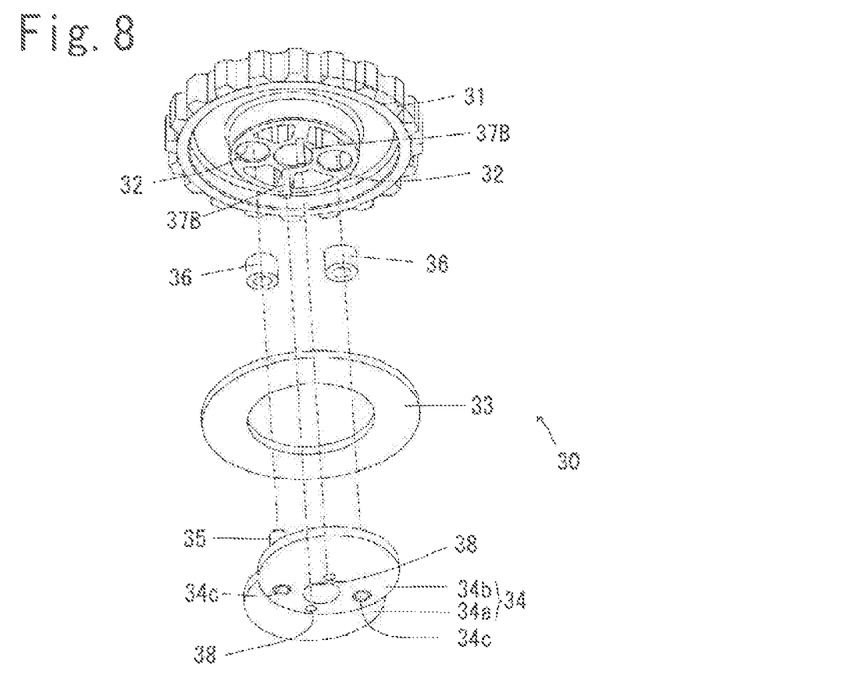
FIG. 8 is a disassembled perspective view of a modification of the speed-reduction gear and the crank-cam.

In a practical embodiment, the small diameter portion 32a of mounting hole 32 may be eliminated as shown in FIG. 5 (b) or the stopper 37 may be removed as shown in FIG. 5 (c). Illustrated in FIGS. 7 and 8 are various modifications of the present invention. As shown in FIG. 7 (a), the stoppers 37, 37 each are replaced with a cylindrical stopper 37A which is formed larger in inner diameter than the outer diameter of the connecting pin 35 and in engagement with the inner surface of the mounting hole 32. In a modification shown in FIG. 7 (b), the connecting pins 35, 35 each are replaced with a stepped connecting pin which is formed with a large diameter portion 35a smaller in diameter than the elastic bushing 36.

Although in the preferred embodiment, the connecting pin 35 is fixed at its one end to the crank-cam 34 and engaged at its other end with the mounting hole 32 of speed-reduction gear 31 through the elastic bushing 36, the connecting pin 35 may be fixed at its one end to the speed-reduction gear 31 and engaged at its other end with a mounting hole 32 of crank-cam 34 through the elastic bushing 36 as shown in FIGS. 7 (c)~(e).

In a modification shown in FIG. 7 (c), the cylindrical stopper 37 is engaged with the connecting pin 35 in the mounting hole 32 of the crank-cam 34, and the small diameter portion 32a of mounting hole is located as a stopper under the elastic bushing 36. As shown in FIG. 7 (d), the cylindrical stopper 37 may be replaced with a cylindrical stopper 37A larger in inner diameter than the connecting pin 35 and being in engagement with the inner surface of mounting hole 32. In a modification shown in FIG. 7 (e), the connecting pins 35, 35 each are replaced with a stepped connecting pin 35A which is formed with a large diameter portion 35Aa smaller in diameter than the elastic bushing 36.

In a modification shown in FIG. 8, two stopper pins 37B, 37B are fixed to the bottom of speed-reduction gear 31 to be concentrically inserted into the corresponding engagement holes 38, 38 formed in the crank-cam 34. The engagement holes 38, 38 each are formed larger in diameter than the stopper pin 37A to be spaced from the stopper pin in a clearance smaller in thickness than the elastic bushing 36. When the elastic bushings 36, 36 in this modification have been deformed by heavy load, the stopper pins 37, 37 are brought into engagement with each inner surface of engagement holes 38, 38 to restrict the deformation of bushings 36, 36 thereby to prevent damage of the bushings.

In the foregoing embodiment, the cylindrical stopper 37 may be made of hard synthetic resin, ceramics or other metal. Although in the foregoing embodiment, the present invention has been adapted to a power-operated hedge trimmer, it is to be noted that the present invention can be adapted to an electrically powered grass shear equipped with a crank mechanism for operating a pair of relatively reciprocating shear blades or a cutting blade reciprocating relatively to a stationary shear blade.

What is claimed is:

1. An electrically powered gardening tool comprising:
   a speed-reduction gear rotatably mounted to a bottom surface of a motor housing and driven by an electric motor housed within the motor housing;
   a crank-cam defined by overlapped eccentric disk plates connected to a bottom surface of the speed-reduction gear; and
   a pair of reciprocating shear blades operatively connected to the eccentric disk plates, wherein
   one of the eccentric disk plates and the speed-reduction gear further includes connecting pins that connect the one of the eccentric disk plates and the speed-reduction gear to the other of the eccentric disk plates and the speed-reduction gear,
   elastic bushings are disposed in mounting holes provided in the other of the eccentric disk plates and the speed-reduction gear,
   the connecting pins are received in the mounting holes to engage with the elastic bushings so as to cause the eccentric disk plates to rotate with the speed-reduction gear, and
   stoppers are provided in the mounting holes and are configured to abut against a surface of the mounting holes to restrict deformation of the elastic bushings caused by a load applied to the eccentric disk plates.

2. An electrically powered gardening tool as claimed in claim 1, wherein said stoppers are cylindrical stoppers smaller in diameter than a diameter of each of said elastic bushings and are coupled with said connecting pins in the mounting holes.

3. An electrically powered gardening tool as claimed in claim 1, wherein said stoppers are cylindrical stoppers, each cylindrical stopper having an inner diameter that is larger than an outer diameter of each of said connecting pins and said stoppers are engaged with an inner surface of each of said mounting holes.

4. An electrically powered gardening tool comprising:
   a speed-reduction gear rotatably mounted to a bottom surface of a motor housing and driven by an electric motor housed within the motor housing;
   a crank-cam defined by overlapped eccentric disk plates connected to a bottom surface of the speed-reduction gear; and
   a pair of reciprocating shear blades operatively connected to the eccentric disk plates, wherein
   one of the eccentric disk plates and the speed-reduction gear further includes connecting pins that connect the one of the eccentric disk plates and the speed-reduction gear to the other of the eccentric disk plates and the speed-reduction gear,
   elastic bushings are disposed in mounting holes provided in the other of the eccentric disk plates and the speed-reduction gear,
   the connecting pins are received in the mounting holes to engage with the elastic bushings so as to cause the eccentric disk plates to rotate with the speed-reduction gear,
   the connecting pins include a step defining a small diameter portion and a large diameter portion with a diameter larger than a diameter of the small diameter portion, the small diameter portion having a diameter smaller than a diameter of each of said elastic bushings and the large diameter portion of each of the connecting pins together define stoppers, and
   the stoppers are provided in the mounting holes and are configured to abut against a surface of the mounting holes to restrict deformation of the elastic bushings caused by a load applied to the eccentric disk plates.

5. An electrically powered gardening tool comprising:
   a speed-reduction gear rotatably mounted to a bottom surface of a motor housing and driven by an electric motor housed within the motor housing, a bottom surface of the speed-reduction gear including stopper pins fixed thereto;
   a crank-cam defined by overlapped eccentric disk plates connected to the bottom surface of the speed-reduction gear, the eccentric disk plates including engagement holes; and a pair of reciprocating shear blades operatively connected to the eccentric disk plates, wherein one of the eccentric disk plates and the speed-reduction gear further includes connecting pins that connect the one of the eccentric disk plates and the speed-reduction gear to the other of the eccentric disk plates and the speed-reduction gear, elastic bushings are disposed in mounting holes provided in the other of the eccentric disk plates and the speed-reduction gear, the connecting pins are received in the mounting holes to engage with the elastic bushings so as to cause the eccentric disk plates to rotate with the speed-reduction gear, the stopper pins passing through the engagement holes of the eccentric disk plates, the engagement holes of the eccentric disk plates each having a diameter that is larger than a diameter of each of the stopper pins and thereby defining clearances, the clearances each have a thickness smaller than a thickness of each of said elastic bushings, and the stopper pins are provided to restrict deformation of the elastic bushings caused by a load applied to the eccentric disk plates.

6. An electrically powered gardening tool comprising:

a speed-reduction gear rotatably mounted to a bottom surface of a motor housing and driven by an electric motor housed within the motor housing;

a crank-cam defined by overlapped eccentric disk plates connected to a bottom surface of the speed-reduction gear; and a pair of reciprocating shear blades operatively connected to the eccentric disk plates, wherein one of the eccentric disk plates and the speed-reduction gear further includes connecting pins that connect the one of the eccentric disk plates and the speed-reduction gear to the other of the eccentric disk plates and the speed-reduction gear, elastic bushings are disposed in mounting holes provided in the other of the eccentric disk plates and the speed-reduction gear, the connecting pins are received in the mounting holes to engage with the elastic bushings so as to cause the eccentric disk plates to rotate with the speed-reduction gear, and a diameter portion of each of said mounting holes defines stoppers that are provided to restrict deformation of the elastic bushings caused by a load applied to the eccentric disk plates, the diameter portion of each of said mounting holes being larger than a diameter of each of said connecting pins and smaller than a diameter of each of said elastic bushings.

* * * * *